Figure 1:
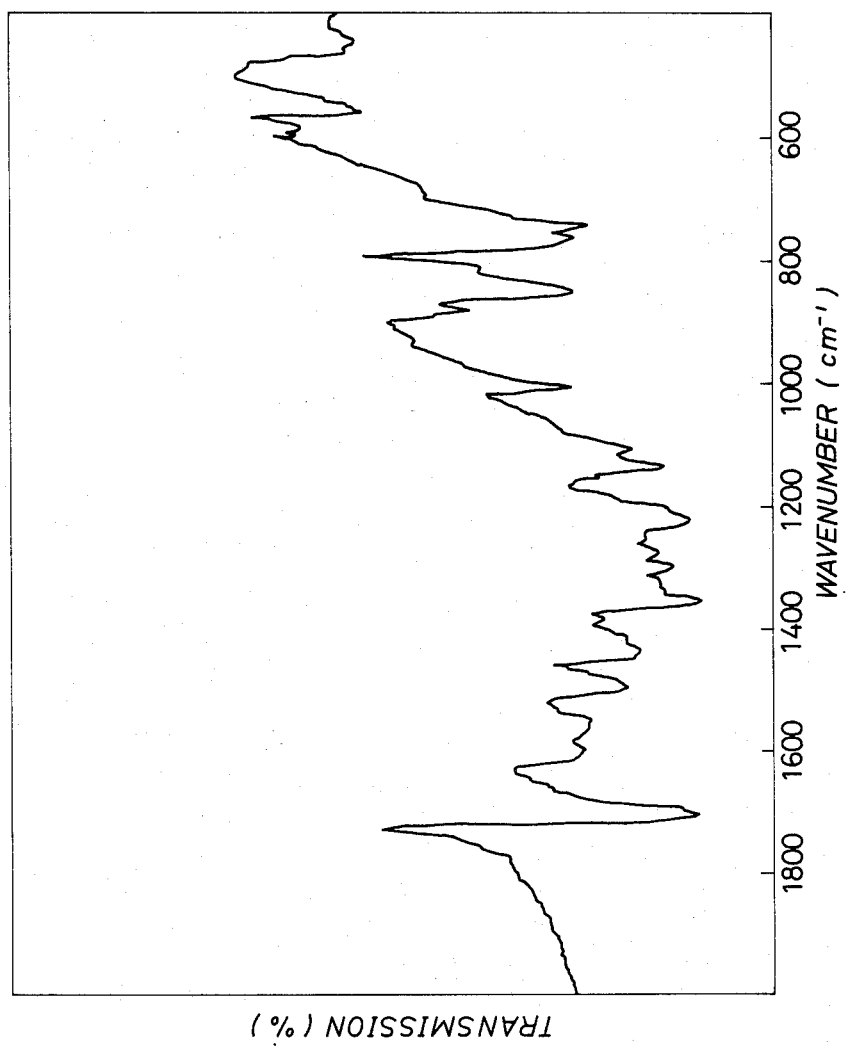

United States Patent [19]

Suzuki et al.

[11] Patent Number: 4,618,555
[45] Date of Patent: Oct. 21, 1986

[54] ELECTROPHOTOGRAPHIC PHOTORECEPTOR COMPRISING AZO COMPOUNDS

[75] Inventors: Tetsumi Suzuki, Isehara; Tetsuo Murayama, Machida; Hitoshi Ono, Yokohama; Shinji Aramaki, Machida; Michiyo Yokoyama, Yokohama, all of Japan

[73] Assignee: Mitsubishi Chemical Ind., Ltd., Tokyo, Japan

[21] Appl. No.: 686,991

[22] Filed: Dec. 27, 1984

[30] Foreign Application Priority Data

Jan. 11, 1984 [JP] Japan .................................. 59-3167

[51] Int. Cl.$^4$ ........................ G03G 5/06; G03G 5/14
[52] U.S. Cl. ........................................ 430/78; 430/58
[58] Field of Search ........................... 430/57, 58, 78; 534/751, 752, 796

[56] References Cited

U.S. PATENT DOCUMENTS 4,396,696 8/1983 Nagasaka et al. .................... 430/78
4,507,471 3/1985 Ohta .................................. 430/78 X Primary Examiner—John D. Welsh
Attorney, Agent, or Firm—David G. Conlin; George W. Neuner

[57] ABSTRACT

An electrophotographic photoreceptor according to this invention has a photosensitive layer in which a photoconductive substance with the following general formula (I):

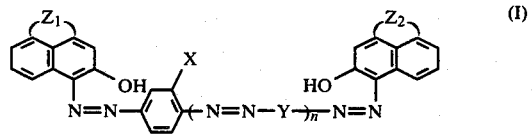

wherein
X is selected from the group consisting of hydrogen atom, lower alkyl group, lower alkoxy group, halogen atom and cyano group;
Y is phenylene or naphthylene group;
$Z_1$ and $Z_2$ are independently the divalent group represented by the following formula:

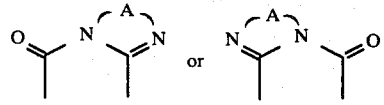

wherein
A is a divalent group derived from the aromatic hydrocarbon or heterocyclic compound including one or more nitrogen atoms in the ring; and
n is 1 or 2, is incorporated.

13 Claims, 3 Drawing Figures

ELECTROPHOTOGRAPHIC PHOTORECEPTOR COMPRISING AZO COMPOUNDS

This invention relates to a novel azo compound suitable as a photoconductive substance in a photosensitive layer of an electrophotographic photoreceptor which has the excellent sensitivity and the excellent durability, and the electrophotographic photoreceptor, the photosensitive layer of which contains the photoconductive substance of the novel azo compound.

Hitherto inorganic photoconductive substances such as selenium, cadmium sulfide, zinc oxide and the like have been known to contain in the photosensitive layer of the electrophotographic photoreceptor. And as a substitute of such an inorganic photoconductive substance, organic photoconductive substances such as polyvinyl carbazole have been recently proposed and some of them are practically commercialized owing to their advantages over the inorganic photoconductive substances described as follows:

(1) they are light in weight;
(2) they can be easily formed to be a film;
(3) they can be easily formed to be the photoreceptor; and
(4) by selecting the transparent photoreceptor can be formed.

Although the organic photoconductive substances have the advantages mentioned above, they are neither preferably nor frequently available in the electrophotographic photoreceptor because the electrophotographic photoreceptor having the photosensitive layer in which the organic photoconductive substance is incorporated provides the sensitivity and the durability inferior to the use of the inorganic photoconductive substances.

It is an object of this invention to provide the electrophotographic photoreceptor having the excellent sensitivity and the excellent durability.

It is another object of this invention to provide the photoconductive substance which is capable of forming such an electrophotographic photoreceptor.

Other objects of this invention will be apparent from the following descriptions.

In accordance with this invention, the electrophotographic photoreceptor having the excellent sensitivity and the excellent durability can be provided by using the specified azo compound as the organic photoconductive substance.

The azo compound used in this invention as the organic photoconductive substance (hereinafter referred to as "the present compound") has the following general formula (I):

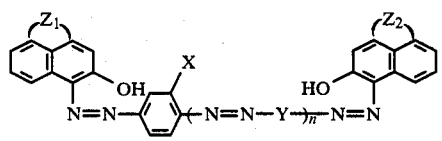
(I)

wherein
X is selected from the group consisting of hydrogen atom, lower alkyl group, lower alkoxy group, halogen atom and cyano group;
Y is phenylene or naphthylene group;
$Z_1$ and $Z_2$ are independently the divalent group represented by the following formula:

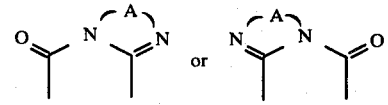

wherein
A is a divalent group derived from the aromatic hydrocarbon or heterocyclic compound including one or more nitrogen atoms in the ring; and
n is 1 or 2.

As the aromatic hydrocarbon from which the divalent group A is derived, both monocyclic and condensed polycyclic hydrocarbon may be used and as the heterocyclic compounds, the compounds having five- to ten-membered ring in which one or more nitrogen atoms, preferably one or two nitrogen atoms are included may be used. Typically, o-phenylene, o-naphthylene, peri-naphthylene, 1,2-anthraquinonylene, 9,10-phenanthrylene, pyrazole-3,4-diyl, pyridine-2,3-diyl, pyrimidine-4,5-diyl, indazole-6,7-diyl, benzimidazole-5,6-diyl and quinoline-6,7-diyl are exemplified as such a divalent group.

The present compound having the general formula (I) wherein X is hydrogen atom, Y is phenylene group, $Z_1$ and $Z_2$ are independently the divalent group represented by the following formula:

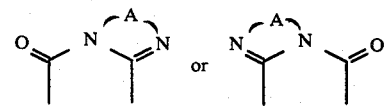

wherein A is o-phenylene, o-naphthylene, peri-naphthylene, pyridine-2,3-diyl or pyrimidine-2,3-diyl, especially o-phenylene or o-naphthylene and n is 1 or 2 is preferable.

The above-mentioned divalent group may be substituted with any substituent, for example, alkyl group such as methyl, ethyl, n-, i-propyl, n-, i-butyl and n-hexyl; alkoxy group such as methoxy, ethoxy, propoxy and butoxy; amino group; alkylamino group such as methylamino and ethylamino; dialkylamino group such as dimethylamino and diethylamino; hydroxy group; nitro group; cyano group; halogen atom such as fluorine, chlorine, bromine and iodine; carboxyl group; alkoxycarbonyl group such as ethoxycarbonyl; carbamoyl group; aryloxy group such as phenoxy; arylalkoxy group such as benzyloxy; and aryloxycarbonyl group such as phenyloxycarbonyl. Among the above-mentioned substituents, alkyl, alkoxy, amino, alkylamino, dialkylamino, nitro, halogen, hydroxy and carboxyl are preferable. Methyl, methoxy, nitro, chlorine, hydroxy, amino and dimethylamino are more preferable.

The present compound can be easily prepared according to the known coupling reaction. For example, the coupling ingredient represented by the following general formula (II-a) and/or (II-b):

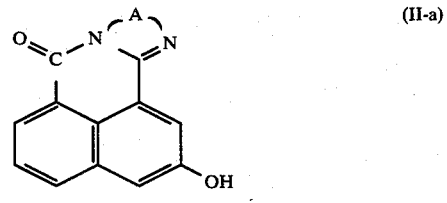
(II-a)

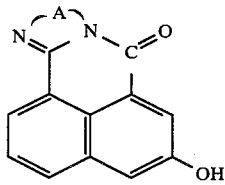

wherein A is a defined above, is reacted with a tetrazonium salt of the diamine represented by the following general formula (III):

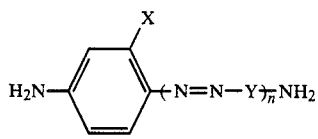

wherein X, Y and n are as defined above, to obtain the present compound.

The coupling reaction is generally carried out in water and/or organic solvent such as dimethylsulfoxide, N,N-dimethyl- formamide, N-methylpyrrolidone and the like at the temperature of not more than 30° C. for about 1 to 10 hours.

The coupling ingredient having the general formula (II-a) and/or (II-b) may be obtained in the manner described in J. Chem. Soc., 1937, 1764, that is, by warming 3-hydroxynaphthalic anhydride represented by the formula (IV):

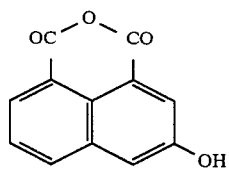

and aromatic diamine represented by the formula (V):

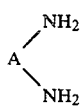

wherein A is as defined above, in the solvent such as acetic acid to condensate with dehydration.

According to the above condensation reaction, the coupling ingredient is obtained in a form of a mixture of isomers (II-a) and (II-b), but both isomers can be used separately or in a form of the mixture thereof for the preparation of the present compound.

The aromatic diamine having the general formula (V) may be o- or peri-primary diamine which is unsubstituted or substituted with one or more of any substituent, for example nitro, alkyl such as methyl, ethyl and propyl, alkoxy such as methoxy, halogen such as chlorine, bromine and iodine, carboxyl, alkoxycarbonyl such as methoxycarbonyl. The following diamine is preferably used.

o-phenylenediamines such as o-phenylenediamine, 4-nitro-o-phenylenediamine, 3,5-dinitro-o-phenylenediamine, 4-methyl-o-phenylenediamine, 4-ethyl-o-phenylenediamine, 4-i-propyl-o-phenylenediamine, 4,5-dimethyl-o-phenylenediamine, 4-methoxy-o-phenylenediamine, 4,5-diethoxy-o-phenylenediamine, 4-chloro-o-phenylenediamine, 4-bromo-o-phenylenediamine, 4-iodo-o-phenylenediamine, 4-carboxy-o-phenylenediamine and 4-methoxycarbonyl-o-phenylenediamine;

diamine of condensed polycyclic aromatic hydrocarbon such as 1,2-naphthylenediamine, 2,3-naphthylenediamine, 1,8-naphthylenediamine, 1,2-diaminoanthraquinone and 9,10-diaminophenanthrene;

diamine of hetero-monocyclic compound such as 2,3-diaminopyridine, 3,4-diaminopyridine, 4,5-diaminopyridine and 3,4-diaminopyrazol;

diamine of condensed heterocylic compound such as 5,6-diaminoindazole, 6,7-diaminoindazole, 5,6-diaminobenzimidazole and 5,6-diaminoquinoline; and a derivative thereof.

It is possible to obtain the coupling ingredient having the general formula (II-a) and (II-b) by any other methods such as the method similar to the above-coupling reaction except the use of 3-hydroxynaphthalic acid or its ester instead of 3-hydroxynaphthalic anhydride; the method of reductively condensing 3-hydroxynaphthalic anhydride with monoaminomononitro compound (instead of aromatic diamine); the method of condensing the aromatic diamine with 3-sulphonaphthalic anhydride followed by hydrolyzing the sulfo group; and the like.

On the other hand, the diamine having the general formula (III) can be also prepared according to any known method. For example, the diamine having the general formula (III) wherein n is 1, X and Y are as defined above is synthesized in accordance with the following reaction scheme.

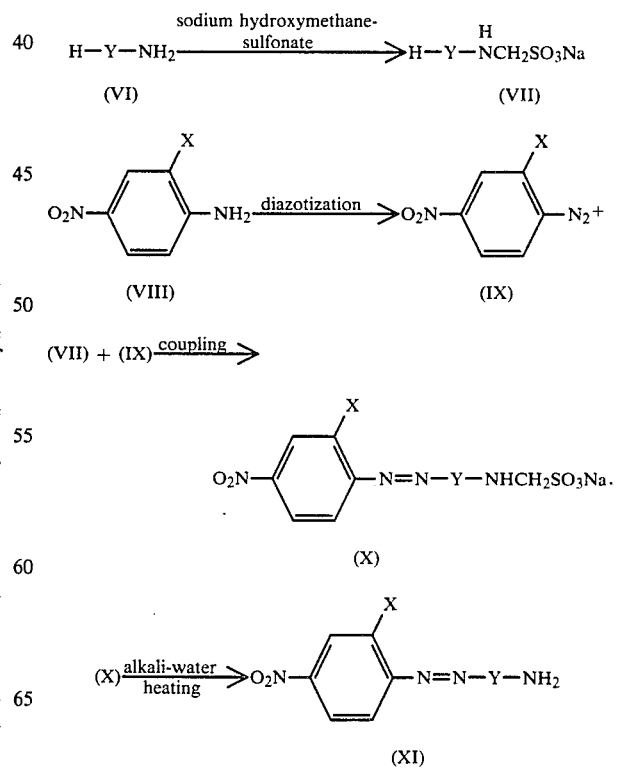

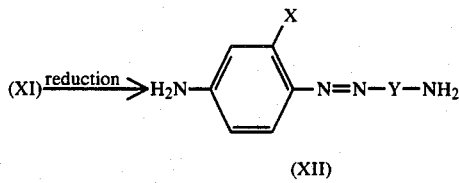

When the diamine having the general formula (III) wherein n is 2 is required, the reaction shown above may be repeated.

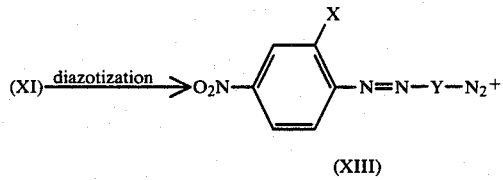

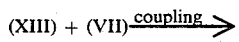

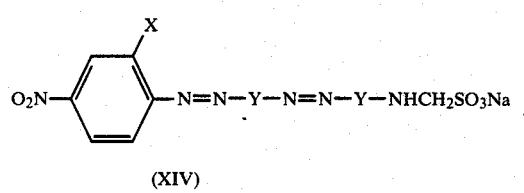

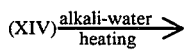

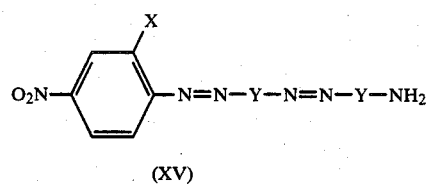

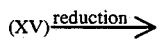

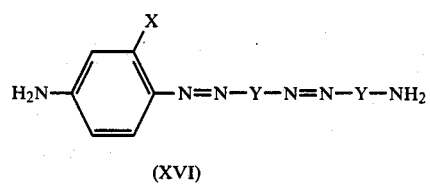

As mentioned above, the present compound can be obtained by reacting the coupling ingredient of the general formula (II-a) and/or (II-b) with the tetrazonium salt of the diamine of the general formula (III). If the mixture of the isomers (II-a) and (II-b) is used as the coupling ingredient, the present compound is obtained in a form of the mixture of the following isomers (I-a) to (I-c), which mixture is applicable to the formation of the electrophotographic photoreceptor according to this invention as it is.

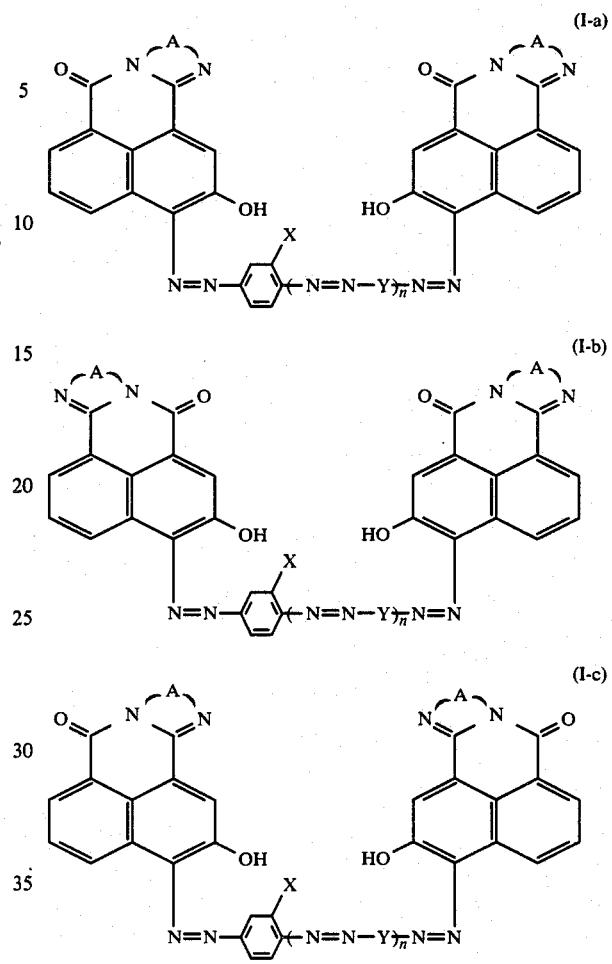

The present compound may be incorporated in the photosensitive layer of the electrophotographic photoreceptor in any known form. Preferably, the present compound is incorporated in the layer for generating the charge carriers (hereinafter referred to as "the generating layer") which is combined with the layer for transporting the charge carriers (hereinafter referred to as "the transporting layer") to form a laminated-typed photosensitive layer since the present compound has the advantage suitable as the material for generating the charge carriers in the photoreceptor, that is, the advantage to be able to generate the charge carriers with high efficiency when light is absorbed.

The generating layer in which the present compound is incorporated is formed by any suitable method. For example, the coating solution in which the present compound is dissolved or dispersed in a suitable solvent with or without a binder polymer is coated on a conductive base followed by drying to form the generating layer.

The solvent used for dissolving or dispersing the present compound to prepare the coating solution is preferably selected from the following solvents:
  amine such as butylamine and ethylenediamine;
  ether such as tetrahydrofuran, methyltetrahydrofuran, 1,4-dioxane and diethyleneglycol dimethyl ether;
  ketone such as methyl ethyl ketone and cyclohexanone;

aromatic hydrocarbon such as toluene and xylene;
alcohol such as methanol, ethanol and isopropanol;
ester such as ethyl acetate, methyl formate and methylcellosolve acetate;
chlorinated aliphatic or aromatic hydrocarbon such as dichloroethane and chloroform; and
others such as N,N-dimethylformamide, acetonitrile, N-methylpyrrolidone and dimethyl sulfoxide.

The above-mentioned solvent may be mixed. And when the binder polymer is used together for the formation of the generating layer, it is preferable to select the solvent which has the ability of dissolving the binder polymer.

As the binder polymer, the homopolymer or copolymer of vinyl compound such as styrene, vinyl acetate, acrylic acid ester and methacrylic acid ester, polyester, polycarbonate, polysulfone, polyvinylbutyral, the resin of phenoxy, urethane and epoxy, and cellulose ester or ether are exemplified. The used amount of the binder polymer is generally 0.1 to 5 parts by weight based on 1 part by weight of the present compound. And preferably, the present compound is present in the binder polymer in a state of finely divided particles of not more than 1 micron in diameter.

The generating layer has the thickness of generally not more than a few microns, preferably not more than 1 micron.

As the conductive base on which the generating layer is provided, any known conductive base for the electrophotographic photoreceptor is available. Generally, the metal such as aluminum or copper in a form of drum, sheet and the like, or the laminate or deposit of such a metal is used. Alternatively, a film, sheet, drum or pipe made of plastic or paper on which a conductive material such as metal powder, carbon black, carbon fiber, cupric iodate, polymeric electrolyte in a suitable binder is coated, or in which the above-mentioned conductive material is mixed so as to make conductive may also be used.

The transporting layer is usually and preferably laminated on the generating layer since the former prevents the latter from wearing and becoming dirty due to the thin thickness of the latter. Of course, the construction of laminating the generating layer on the transporting layer is possible.

The transporting layer acts to transport the charge carriers generated in the generating layer and so this layer contains necessarily a medium for transporting the charge carriers. As the medium for transporting the charge carriers, a medium for transporting the electrons and/or a medium for transporting the holes is used. The medium for transporting the electrons may comprise the electron-attractive compound having the electron-attracting group such as nitro, cyano and ester group, for example 2,4,7-trinitrofluorenone, 2,4,5,7-tetranitrofluorenone or 2,4,5,7-tetracyanoquinodimethane. While, the medium for transporting the holes may comprise the electrondonating compound, for example the heterocyclic compound such as carbazole, indole, imidazole, oxazole, thiazole, oxadiazole, pyrazole, pyrazoline and thiadiazole, aniline derivative, hydrazine derivative, hydrazone derivative or the polymer having the group derived from the above-mentioned compound in the principal or side chain such as polyvinylcarbazole and polyglycidyl carbazole. Among them, the use of the hydrazone represented by the general formula (XVII) or (XVIII) shown later or a mixture thereof is preferable.

wherein $R^1$ is alkyl or aralkyl which may be substituted, $R^2$ is alkyl which may be substituted, allyl, phenyl, naphthyl or aralkyl, and $Z^3$ is hydrogen, halogen, alkyl or alkoxy;

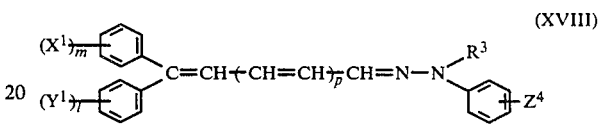

wherein $X^1$, $Y^1$ and $Z^4$ are independently hydrogen, lower alkyl or alkoxy, phenoxy or arylalkoxy, $R^3$ is hydrogen, lower alkyl, allyl, phenyl or aralkyl, m and l is 1 or 2, and p is 0 or 1.

The transporting layer is formed in a similar method to the method for forming the generating layer. When the medium for transporting the charge carriers comprises low-molecular compound, it is preferable to dissolve the compound in the binder polymer. The compound as the medium for transporting the charge carriers is used in an amount of 0.2 to 1.5 part by weight, preferably 0.3 to 1.2 part by weight based on 1 part by weight of the binder polymer.

The transporting layer has the thickness of generally 5 to 50 microns, preferably 10 to 30 microns.

The photosensitive layer thus obtained may contain any known sensitizer. The sensitizer is suitably a material which is able to form a complex for transporting the charge with the organic photoconductive compound, of which illustrative examples are Lewis acid and dye. The Lewis acid may be the electron-attractive compound, for example quinone such as chloranil, 2,3-dichloro-1,4-naphthoquinone, 2-methyl-anthraquinone, 1-nitroanthraquinone, 1-chloro-5-nitroanthraquinone, 2-chloroanthraquinone and phenanthrene quinone, aldehyde such as 4-nitrobenzaldehyde, ketone such as 9-benzoylanthracene, indandione, 3,5-dinitrobenzophenone and 3,3',5,5'-tetranitrobenzophenone, acid anhydride such as phthalic anhydride and 4-chloronaphthalic anhydride, cyano compound such as tetracyanoethylene, terephthalalmalononitrile, 4-nitrobenzalmalononitrile and 4-(p-nitrobenzoyloxy)benzal malononitrile, phthalide such as 3-benzalphthalide, 3(α-cyano-p-nitrobenzal)-phthalide and 3-(α-cyano-p-nitrobenzal)-4,5,6,7-tetrachlorophthalide are exemplified. As the dye, triphenyl methane dye such as methyl violet, brilliant green and crystal violet, thiazine dye such as methylene blue, quinone dye such as quinizarin, cyanin dye and pyrylium salt such as thiapyrylium salt and benzopyrylium salt are exemplified.

In addition to the sensitizer, the photosensitive layer may contain any known plasticizer such as phthalic acid ester, phosphoric acid ester, epoxy compound, chlorinated paraffin, chlorinated fatty acid ester and methyl naphthalate, whereby the film-formability, the flexibility as well as the mechanical strength of the layer being improved.

If necessary, the adhesive layer, the intermediate layer and/or the transparent insulating layer are provided in the photoreceptor.

The photoreceptor having the photosensitive layer in which the present compound is incorporated has the following advantages:

photographic sensitivity is high;

color sensitivity is high;

photographic sensitivity and chargeability are almost unchanged even if the repeated use;

fatigue against light is little; and durability is very good.

Owing to the above-mentioned advantages, the photoreceptor according to this invention is widely applied in the electrophotography, for example in the electrophotographic copying machine. In the photoreceptor of this invention the maximum wavelength to which it can be sensitive is 600 to 650 nm. Therefore, the photoreceptor of this invention is applicable in the printer employing laser, OFT(optical fiber tube) and LED (light-emitting diode).

This invention will be more specifically described with the aid of the following specific, but non-limiting examples.

EXAMPLE 1

Synthesis of Compound (Compound No. 1)

(a) 13.8 parts by weight of 3-hydroxynaphthalic anhydride (manufac. by TOKYO KASEI KOGYO CO., Ltd.) and 9.2 parts by weight of o-phenylenediamine (manufac. by TOKYO KASEI KOGYO CO., Ltd.) were dissolved in a mixed solvent of 30 parts by weight of acetic acid and 150 parts by weight of nitrobenzene while stirring and reacted at the boiling point of acetic acid for 2 hours. After the completion of reaction, a reaction mixture was allowed to stand at room temperature to crystallize out followed by collecting the crystals through filtration, washing with methanol and drying to obtain 17.8 parts by weight of a crystalline product having yellow in color and feather in form.

The characteristics of the thus obtained product were as follows.

(1) melting point; more than 320° C., (2) elementary analysis; $C_{18}H_{10}O_2N_2$

|  | C(%) | H(%) | N(%) |
|---|---|---|---|
| theoretical: | 75.54 | 3.53 | 9.78 |

-continued

|  | C(%) | H(%) | N(%) |
|---|---|---|---|
| experimental: | 75.50 | 3.49 | 9.72 |

According to the above-mentioned data and IR spectrum, it was confirmed that the product was 2-hydroxy- and 5-hydroxy-7H-benzimidazo-[2,1-a]benz[de]isoquinoline-7-on.

(b) Firstly 1.2 part by weight of 4,4-diaminoazobenzene was dissolved in 30 parts by weight of glacial acetic acid and then 7 parts by weight of an aqueous 35 % hydrochloric acid solution was added dropwise thereinto while stirring. After 30 minutes, 30 parts by weight of water was further added and then cooled to the temperature of 0° to 5° C. The thus cooled mixture was added dropwise into a solution of 1.6 part by weight of sodium nitrite in 5 parts by weight of water while stirring.

After 30 minutes, 15 parts by weight of an aqueous 42% tetrafluoroboric acid solution was added dropwise and crystallize out a corresponding tetrazonium tetrafluoroborate, which was then collected through filtration.

(c) The tetrazonium salt obtained in above (b) without drying dissolved in 600 parts by weight of dimethylsulfoxide at room temperature was added dropwise into a solution in which 3.2 parts by weight of isoquinoline-7-on obtained in above (a) was dissolved in 460 parts by weight of dimethylsulfoxide while heating and then cooled to room temperature, and then reacted using a solution of 5 parts by weight of sodium acetate in 1.2 part by weight of water while maintaining a reaction temperature at about 20° C. followed by purifying according to the conventional method to obtain 3.3 parts by weight of the solid product having dark purple in color.

The characteristics of the thus obtained product were as follows.

(1) melting point; more than 320° C., (2) elementary analysis; $C_{48}H_{26}N_{10}O_4$

|  | C(%) | H(%) | N(%) |
|---|---|---|---|
| theoretical: | 71.46 | 3.23 | 17.37 |
| experimental: | 71.19 | 3.04 | 17.28 |

(3) IR spectrum; as shown in FIG. 1 of the accompanying drawings.

According to the above-mentioned data, it was confirmed that the product was a mixture of trisazo compound having the following formula.

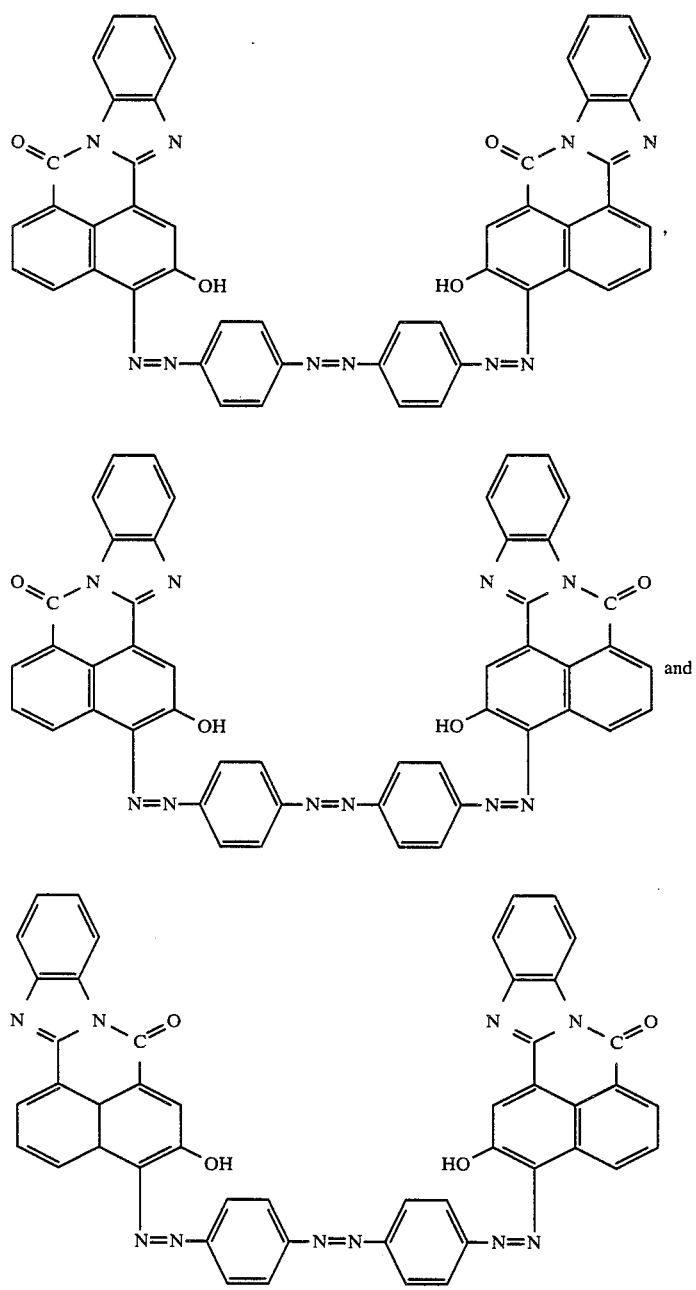

EXAMPLE 2

Synthesis of Compound (Compound No. 2)

(a) 12.8 parts by weight of 3-hydroxynaphthalic anhydride (manufac. by TOKYO KASEI KOGYO CO., Ltd.) and 7.3 parts by weight of 3,4-diaminotoluene (manufac. by TOKYO KASEI KOGYO CO., Ltd.) were dissolved in a mixed solvent of 30 parts by weight of acetic acid and 150 parts by weight of nitrobenzene while stirring and reacted at the boiling temperature of acetic acid for 2 hours. After the completion of the reaction, a reaction mixture was allowed to stand at room temperature to crystallize out followed by collecting through filtration, washing with methanol and drying to obtain 17.8 parts by weight of the crystalline product having yellow in color and feather in form.

The characteristics of the thus obtained product were as follows.

(1) melting point; not more than 320° C.,
(2) elementary analysis; $C_{19}H_{12}O_2N_2$

|  | C(%) | H(%) | N(%) |
| --- | --- | --- | --- |
| theoretical: | 76.00 | 4.00 | 9.33 |
| experimental: | 75.83 | 3.89 | 9.31 |

According to the above-mentioned data and IR spectrum, it was confirmed that the product was 2-hydroxy- and 5-hydroxy-7H-3',[4']methylbenzimidazo[2,1-a]benz[de]isoquinoline-7-on.

(b) In the similar manner to that of Example 1 except that one of the coupling ingredients was replaced by isoquinoline-7-on prepared in above (a), the solid product having dark purple in color was obtained.

The characteristics of the thus obtained product were as follows.

(1) melting point; more than 320° C.,
(2) elementary analysis; $C_{50}H_{30}N_{10}O_4$

|  | C(%) | H(%) | N(%) |
|---|---|---|---|
| theoretical: | 71.94 | 3.60 | 16.79 |
| experimental: | 71.83 | 3.18 | 16.53 |

Figure 2:
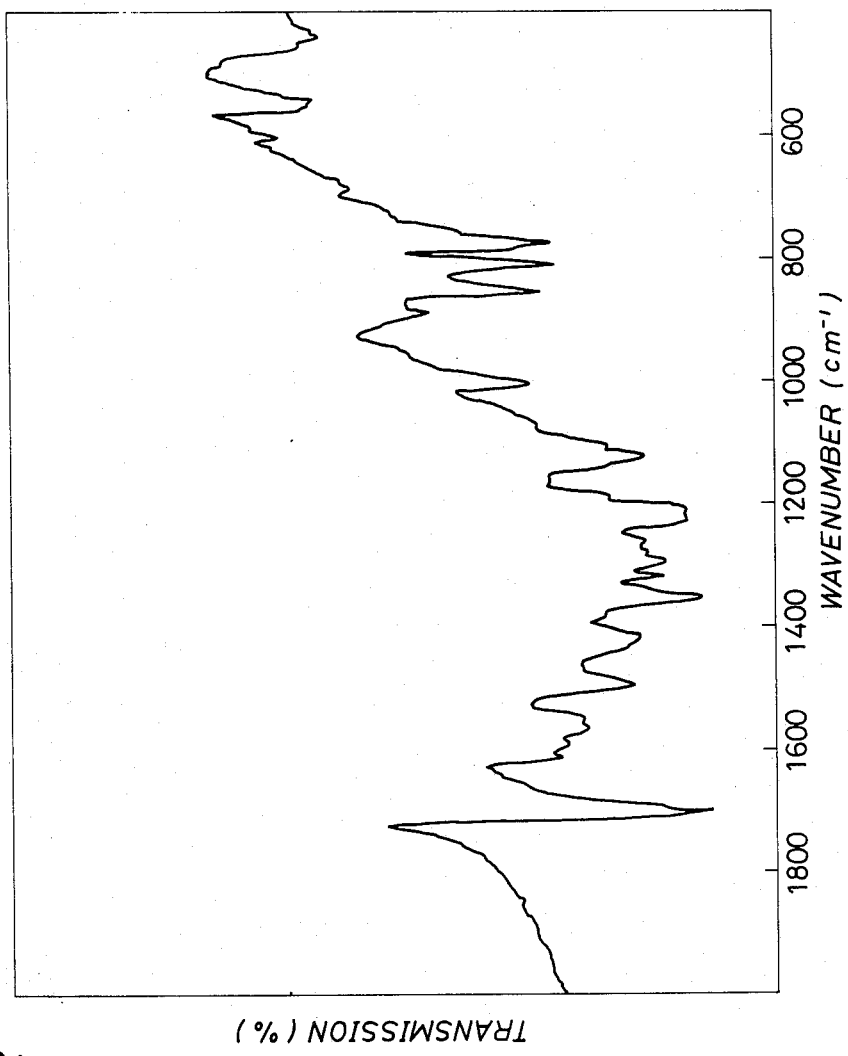

(3) IR spectrum; as shown in FIG. 2 of the accompanying drawings.

According to the above-mentioned data, it was confirmed that the product was a mixture of trisazo compound having the following formula.

EXAMPLE 3

Synthesis of Compound (Compound No. 3)

The tetrazonium salt was prepared in the same manner as that of Example 1 except that 4,4'-diaminoazobenzene was replaced by (4-aminophenyl)azo-4'-aminonaphthalene. This tetrazonium salt was subjected to the coupling reaction with isoquinoline-7-on prepared in Example 2 (a) described above to obtain the solid product having dark purple in color.

The characteristics of the thus obtained product were as follows.

(1) melting point; more than 320° C.,
(2) elementary analysis; $C_{54}H_{32}N_{10}O_4$

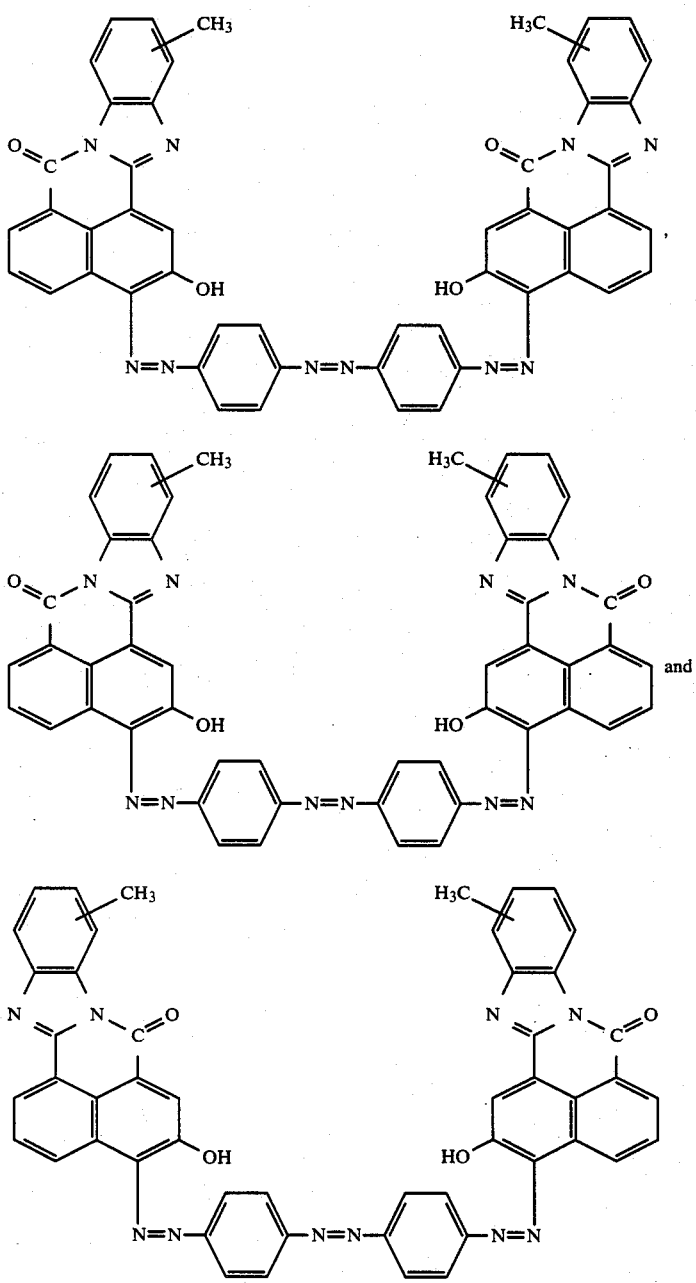

Figure 3:
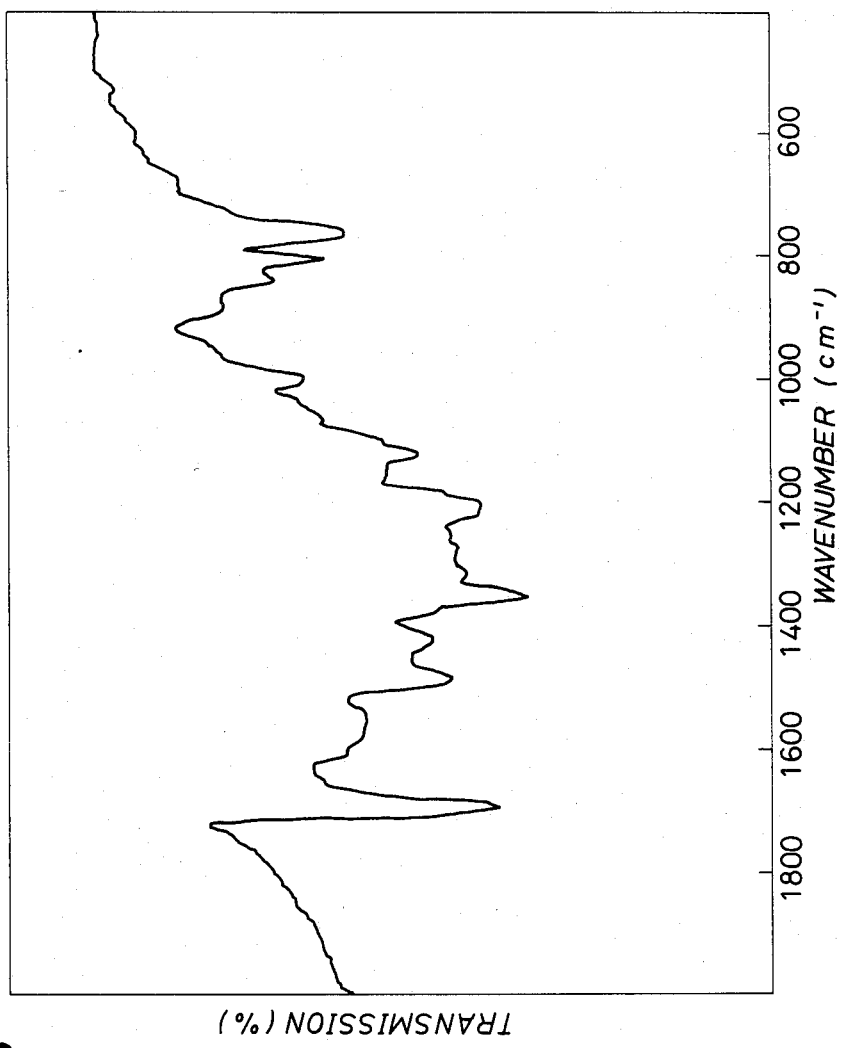

|  | C(%) | H(%) | N(%) |
|---|---|---|---|
| theoretical: | 73.30 | 3.62 | 15.84 |
| experimental: | 72.91 | 3.32 | 15.38 |
(3) IR spectrum; as shown in FIG. 3 of the accompanying drawings.
According to the above-mentioned data, it was confirmed that the product was a mixture of trisazo compound having the following formula.
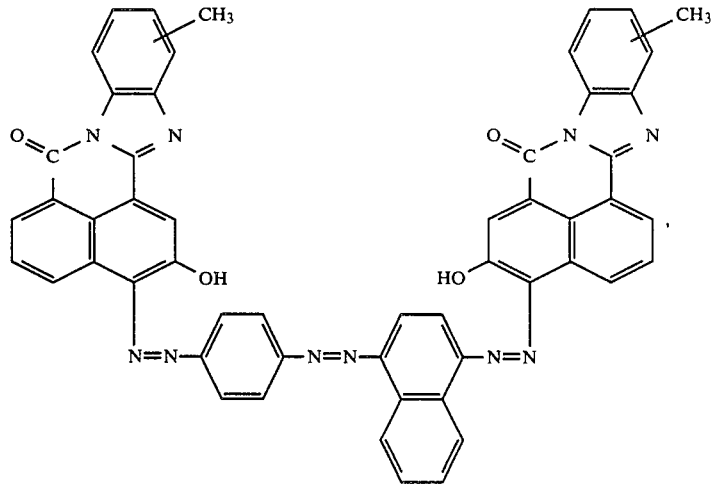
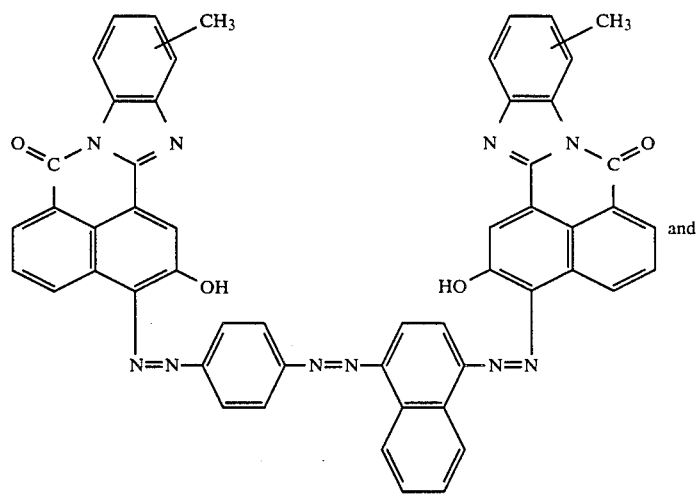
and
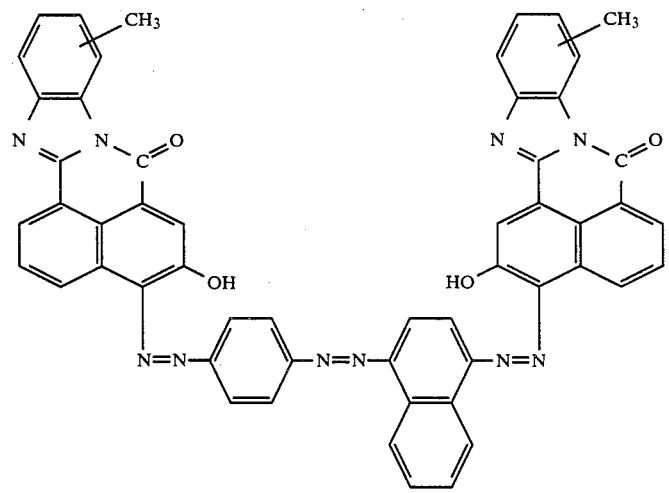
In this similar manner, the compounds of Compound No. 4 to 21 were synthesized.

EXAMPLE 4

Formation of photoreceptor

Into 0.45 part by weight of each of the present compound synthesized in the above-mentioned Examples which was dispersed in 30 parts by weight of cyclohexanone by means of a sand grinder, 0.9 part by weight of polyester (Vyrone 200 ® manufact. by TOYOBO CO., LTD.) was added and dissolved to prepare a dispersion.

The thus prepared dispersion was coated on an aluminum layer deposited on a polyester film of 100 microns in thickness so as to provide dried film of 0.6 g/m² thickness and dried to form a generating layer.

Onto this layer, a solution of 80 parts by weight of N-ethylcarbazole-3-aldehyde-diphenylhydrazone and 100 parts by weight of methacrylic resin (Dianal ® manufac. by Mitsubishi Rayon Co., Ltd.) in 550 parts by weight of toluene to provide dried film of 10 microns thickness and dried to form a transporting layer. In this way, a two-layered photosensitive layer comprising the transporting layer on the generating layer was provided on the aluminum base to form a photoreceptor.

The sensitivity of the photoreceptor was investigated on the basis of half-exposure ($E_{\frac{1}{2}}$) determined as follows.

The photoreceptor was submitted to a corona discharge of $-6.5$ KV in dark so as to charge the surface of the photoreceptor, and the surface voltage (initial surface voltage) was measured by means of a test device for electrostatic copying paper (Model SP-428 manufac. by Kawaguchi Electric Works, Ltd.). Then the surface of the photoreceptor was irradiated by white light of 5 lux till the surface voltage was reduced by half of the initial surface voltage. The half-exposure was ($E_{\frac{1}{2}}$) was calculated from the time required for reducing by half.

The results are shown in Table 1.

TABLE 1

| Compound No. | X | Y | Z | n | $E_{\frac{1}{2}}$ (lux · sec) |
|---|---|---|---|---|---|
| 1 | H | (p-phenylene) | (phenyl with O=C–N=C–N fused group, ortho) | 1 | 3.2 |
| 2 | H | (p-phenylene) | (phenyl with CH₃, O=C–N=C–N group) | 1 | 3.1 |
| 3 | H | (naphthylene) | (phenyl with CH₃, O=C–N=C–N group) | 1 | 3.4 |
| 4 | H | (p-phenylene) | (phenyl with H₃C, CH₃, O=C–N=C–N group) | 1 | 2.0 |

TABLE 1-continued

| Compound No. | X | Y | Z | n | $E_{\frac{1}{2}}$ (lux · sec) |
|---|---|---|---|---|---|
| 5 | H | naphthalene-1,4-diyl | naphtho[2,3-d]imidazole with N-acetyl and 2-methyl | 1 | 4.9 |
| 6 | H | 1,4-phenylene | 5-chloro-benzimidazole with N-acetyl and 2-methyl | 1 | 5.3 |
| 7 | H | 1,4-phenylene | 5-nitro-benzimidazole with N-acetyl and 2-methyl | 1 | 7.2 |
| 8 | H | 1,4-phenylene | 5-amino-benzimidazole with N-acetyl and 2-methyl | 1 | 4.6 |
| 9 | CN | 1,4-phenylene | 5-N(CH$_3$)$_2$-benzimidazole with N-acetyl and 2-methyl | 1 | 3.6 |

TABLE 1-continued
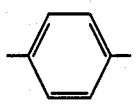
| Compound No. | X | Y | Z | n | $E_{\frac{1}{2}}$ (lux · sec) |
|---|---|---|---|---|---|
| 10 | CH₃ | 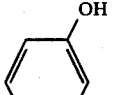 | 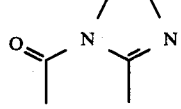 | 1 | 8.2 |
| 11 | H | 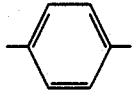 | 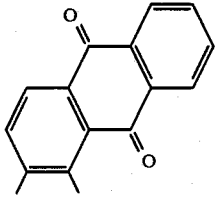 | 1 | 18.3 |
| 12 | OCH₃ | 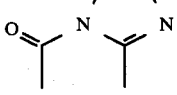 | 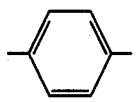 | 1 | 9.2 |
| 13 | H | 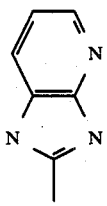 | 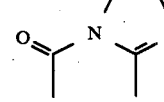 | 1 | 11.3 |
| 14 | Cl | 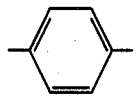 | 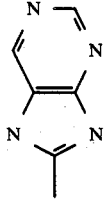 | 1 | 8.7 |

TABLE 1-continued

| Compound No. | X | Y | Z | n | E₁ (lux · sec) |
|---|---|---|---|---|---|
| 15 | H | *p-phenylene* | *quinoxaline with N-acetyl (benzo-fused imidazole with acetyl)* | 1 | 13.2 |
| 16 | H | *1,4-naphthylene* | *benzimidazole with N-acetyl* | 2 | 6.2 |
| 17 | CN | *p-phenylene* | *benzimidazole with N-acetyl* | 1 | 3.8 |
| 18 | H | *p-phenylene* | *5,6-dimethyl benzimidazole with N-acetyl* | 2 | 2.8 |
| 19 | H | *p-phenylene* | *methyl-substituted benzimidazole with N-acetyl* | 2 | 1.2 |

TABLE 1-continued

| Compound No. | X | Y | Z | n | $E_{\frac{1}{2}}$ (lux · sec) |
|---|---|---|---|---|---|
| 20 | H | 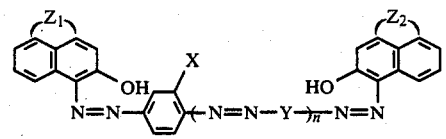 | | 2 | 1.9 |
| 21 | H | 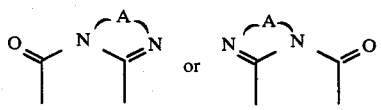 | | 2 | 2.8 |

What is claimed is:

1. An electrophotographic photoreceptor having a photosensitive layer in which a photoconductive substance of azo compound having the general formula (I):

wherein
X is selected from the group consisting of hydrogen atom, lower alkyl group, lower alkoxy group, halogen atom and cyano group;
Y is phenylene or naphthylene group;
$Z_1$ and $Z_2$ are independently the divalent group represented by the following formula:

wherein
A is a divalent group derived from the aromatic hydrocarbon or heterocyclic compound including one or more nitrogen atoms in the ring; and
n is 1 or 2, is incorporated.

2. The photoreceptor of claim 1, wherein the photosensitive layer is provided on a conductive base.

3. The photoreceptor of claim 1 or 2, wherein the azo compound of the general formula (I) is incorporated in a layer for generating charge carriers on which a layer for transporting charge carriers is provided to form a laminated photosensitive layer.

4. The photoreceptor of claim 3, wherein the layer for generating charge carriers is formed by coating on the conductive base a coating solution in which the azo compound of the general formula (I) is dissolved or dispersed in a suitable solvent with or without a binder polymer.

5. The photoreceptor of claim 4, wherein the solvent is amine, ether, ketone, aromatic hydrocarbon, alcohol, ester or chlorinated hydrocarbon.

6. The photoreceptor of claim 4, wherein the binder polymer is a homopolymer or copolymer of vinyl compound, polyester, polycarbonate, polysulfone, polyvinylbutyral, phenoxy resin, cellulose ester or ether, urethane resin or epoxy resin.

7. The photoreceptor of claim 4, wherein the binder polymer is used in an amount of 0.1 to 5 parts by weight based on 1 part by weight of the azo compound.

8. The photoreceptor of claim 3, wherein the layer for generating charge carriers has the thickness of a few microns.

9. The photoreceptor of claim 3, wherein the layer for transporting charge carriers contains a medium for transporting electrons and/or a medium for transporting holes.

10. The photoreceptor of claim 9, wherein the medium for transporting electrons comprises an electron-attracting compound.

11. The photoreceptor of claim 9, wherein the medium for transporting holes comprises an electron-donating compound.

12. The photoreceptor of claim 3, wherein the layer for transporting charge carrier has the thickness of 5 to 50 microns.

13. The photoreceptor of claim 1, wherein the photosensitive layer contains any sensitizer and/or plasticizer.

* * * * *